(12) United States Patent
Rawdon et al.

(10) Patent No.: US 7,644,749 B2
(45) Date of Patent: Jan. 12, 2010

(54) SYSTEM FOR HOLDING A MEMBRANE IN TENSION

(76) Inventors: Matthew Rawdon, 7 Friar La., Cumberland, ME (US) 04021; Jeffrey G Willis, 151 Meadow La., New Gloucester, ME (US) 04260

( * ) Notice: Subject to any disclaimer, the term of this patent is extended or adjusted under 35 U.S.C. 154(b) by 0 days.

(21) Appl. No.: 11/690,346

(22) Filed: Mar. 23, 2007

(65) Prior Publication Data

US 2007/0234658 A1    Oct. 11, 2007

Related U.S. Application Data

(60) Provisional application No. 60/784,989, filed on Mar. 23, 2006.

(51) Int. Cl.
*E06B 9/24* (2006.01)

(52) U.S. Cl. .................. 160/371; 160/392

(58) Field of Classification Search .......... 160/369, 160/371, 392, 395, 273.1, 405; 52/63, 202, 52/222, 273; 24/462, 460; 40/603, 604
See application file for complete search history.

(56) References Cited

U.S. PATENT DOCUMENTS

| | | | | |
|---|---|---|---|---|
| 2,255,581 A * | 9/1941 | Ewing | .................. | 160/392 |
| 2,270,423 A * | 1/1942 | Ewing | .................. | 160/392 |
| 2,287,667 A * | 6/1942 | Brown | .................. | 160/384 |
| 2,335,361 A * | 11/1943 | Schiller | .................. | 160/395 |
| 2,407,784 A * | 9/1946 | Hoffstad | .................. | 160/273.1 |
| 2,597,401 A * | 5/1952 | Swanson | .................. | 160/90 |
| 3,024,068 A | 3/1962 | Eames | | |
| 3,143,165 A * | 8/1964 | Lewis et. al. | .................. | 160/394 |
| 3,300,052 A * | 1/1967 | Steintveit | .................. | 210/402 |
| 3,757,479 A * | 9/1973 | Martinez | .................. | 52/222 |
| 3,805,873 A * | 4/1974 | Bloomfield | .................. | 160/392 |
| 3,987,835 A * | 10/1976 | Bloomfield | .................. | 160/392 |
| 4,084,360 A * | 4/1978 | Reckson | .................. | 52/63 |
| 4,121,604 A | 10/1978 | Rain | | |
| 4,139,234 A * | 2/1979 | Morgan | .................. | 296/201 |
| 4,197,686 A * | 4/1980 | Baslow | .................. | 52/273 |
| 4,355,478 A * | 10/1982 | Armstrong | .................. | 140/92.1 |
| 4,426,760 A * | 1/1984 | Watts | .................. | 29/407.1 |
| 4,534,145 A * | 8/1985 | Yang et al. | .................. | 52/222 |
| 4,625,490 A * | 12/1986 | Baslow | .................. | 52/717.05 |
| 4,638,532 A * | 1/1987 | Yang et al. | .................. | 24/462 |
| 4,726,411 A * | 2/1988 | Conley | .................. | 160/392 |
| 4,757,854 A * | 7/1988 | Rippberger | .................. | 160/391 |
| 4,769,877 A | 9/1988 | Conley | | |
| 4,799,299 A * | 1/1989 | Campbell | .................. | 24/462 |
| 4,899,797 A | 2/1990 | Green | | |
| 4,935,995 A * | 6/1990 | Daus, Jr. | .................. | 24/580.1 |

(Continued)

FOREIGN PATENT DOCUMENTS

JP    2002253391    9/2002
WO    2006/028947 A2    3/2006

*Primary Examiner*—David Purol
(74) *Attorney, Agent, or Firm*—Nils Peter Mickelson

(57) ABSTRACT

A system is provided for the holding of a membrane in tension, that system having: a frame; a plurality of frame members with longitudinal anchoring channels, the channels having first and second channel flanges. Also provided is a retention strip disposed upon at least a part of the periphery of the membrane, wherein the retention strip engages the first and second channel flanges.

3 Claims, 13 Drawing Sheets

U.S. PATENT DOCUMENTS

| | | | |
|---|---|---|---|
| 5,029,422 A * | 7/1991 | Scherrer | 52/222 |
| 5,039,246 A * | 8/1991 | Woodruff et al. | 403/24 |
| 5,058,340 A * | 10/1991 | Muller | 52/222 |
| 5,076,033 A | 12/1991 | Patsy, Jr. | |
| 5,259,323 A * | 11/1993 | Koch et al. | 105/20 |
| 5,301,447 A | 4/1994 | Lotter et al. | |
| 5,673,720 A | 10/1997 | Cuthill | |
| 5,906,078 A | 5/1999 | Cramer | |
| 6,782,647 B2 | 8/2004 | Richards et al. | |
| 6,802,357 B2 * | 10/2004 | Taylor et al. | 160/371 |
| 6,959,518 B2 | 11/2005 | Cousin | |
| 2005/0138869 A1 | 6/2005 | Porter | |

\* cited by examiner

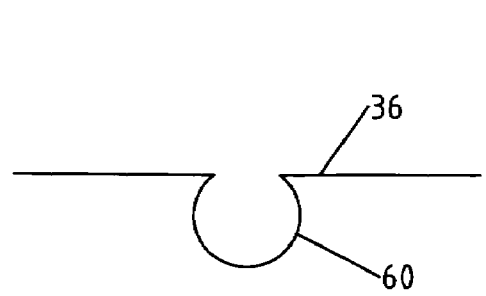
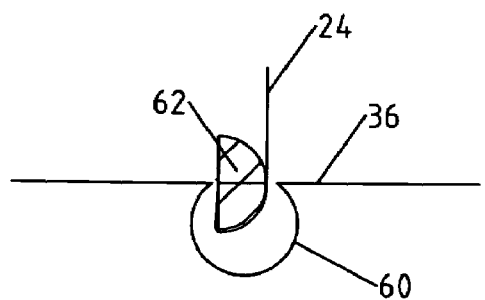
FIG. 13A    FIG.13B
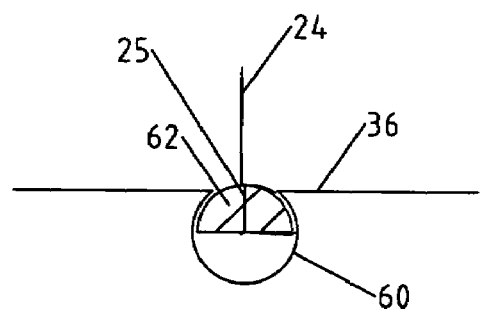
FIG. 13C
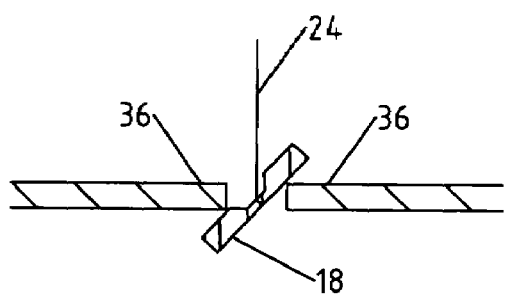
FIG. 14A
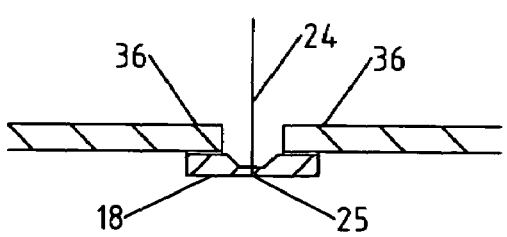
FIG. 14B

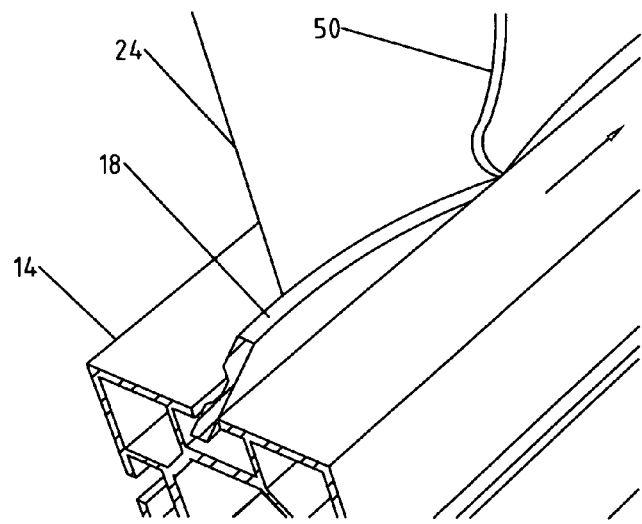
FIG. 18A
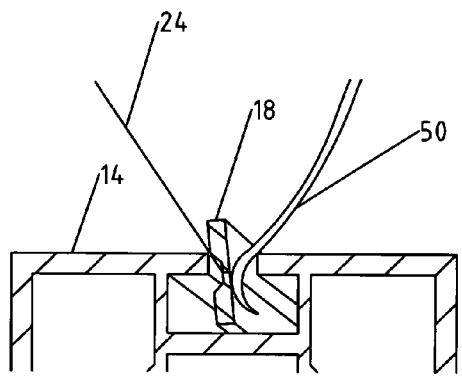
FIG. 18B
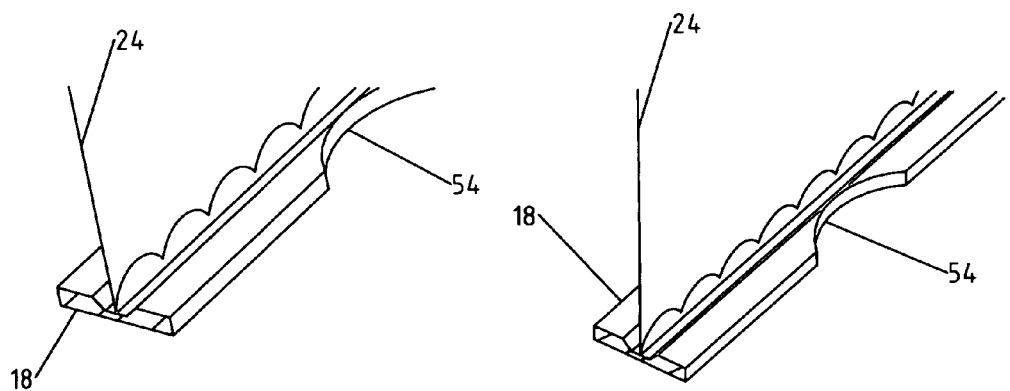
FIG. 18C
FIG. 18D

SYSTEM FOR HOLDING A MEMBRANE IN TENSION

RELATED APPLICATIONS

This application claims the benefit of U.S. Provisional Application No. 60/784,989, filed Mar. 23, 2006. This application is incorporated by reference in its entirety.

FIELD OF THE INVENTION

The invention relates to membrane displays, and more particularly, to a tensioned membrane display backdrop.

BACKGROUND OF THE INVENTION

Typical attachment of tension-membrane/fabric to frames wraps the fabric around the frame. Examples include canvas stretched around a wooden frame and tacked or nailed on the back of the frame, like the traditional painting canvases. Other systems include plastic splines or clips attached to fabrics and secured to the face surface of the frame, whereby the fabric is pulled parallel to the surface of the frame. In both known systems, the tension on the fabric applies a shear force to the fasteners. Complex frames require complex and difficult-to install constructions of fabric. There are several modular frame systems on the market which are used for exhibits, events, architecture, museums and retail environments. These frame systems can be structural or decorative. Most are made of aluminum extrusions. Most use some kind of clamp to assemble one frame member to another. These clamps typically engage the flanges of a groove or channel in the adjacent frame member. This groove is also used to retain panels which can be finished with wall coverings or graphics. With the recent increase in the use of tension fabric in these applications, the benefits of a way to attach fabric directly to the frame, substituting for a rigid panel, are apparent.

What is needed, therefore, are techniques for removably attaching a tensioned fabric to a tensioning display frame.

SUMMARY OF THE INVENTION

One embodiment of the present invention provides for the holding of a membrane in tension, that system having: a frame; a plurality of frame members with longitudinal anchoring channels. The channels having first and second channel flanges. Also provided is a retention strip disposed upon at least a part of the periphery of the membrane, wherein the retention strip engages the first and second channel flanges.

Another embodiment of the present invention provides a method for the holding of a membrane in tension, that method being, inter alia, the insertion of a retention strip between channel flanges, ensuring seating of the retention strip by use of a spline tool or other suitable insertion tool, contacting the channel flanges with the retention strip.

One embodiment of the present invention allows the mounting of a tension-membrane panel directly to a perimeter frame which has a t-shaped groove or channel. This is accomplished by sewing a flexible plastic strip to the membrane, which, when installed, is retained in the groove of the frame. Tension can be parallel or perpendicular to the groove. This leaves the frame exposed, and does not require the membrane to wrap around the frame.

One embodiment of the present invention provides a system for the holding of a membrane in tension, the system comprising: a frame; a plurality of frame members having longitudinal anchoring channels having first and second channel flanges; a retention strip disposed upon at least a part of the periphery of the membrane; wherein the retention strip engages the first and second channel flanges.

Another embodiment of the present invention provides such a system wherein the frame members are configured from materials selected from the group of materials consisting of aluminum, steel, plastic, wood, brass and combinations thereof.

A further embodiment of the present invention provides such a system wherein the first and second channel flanges are co-planar.

Still another embodiment of the present invention provides such a system wherein the longitudinal anchoring channel has cross sectional geometry selected from the group of shapes consisting of rectangular, square, triangular, circular, and semicircular.

A still further embodiment of the present invention provides such a system wherein the longitudinal anchoring channel comprises a gap disposed between first and second side walls wherein the first and second sidewalls are not directly connected.

Yet another embodiment of the present invention provides such a system wherein the membrane is stretchable.

A yet further embodiment of the present invention provides such a system wherein the membrane is a fabric, selected from the group of fabrics consisting of knit, woven and non-woven fabrics.

Even another embodiment of the present invention provides such an system wherein the membrane is a fabric comprising fibers selected from the group of fibers consisting of nylon, cotton, polyester, polypropylene and blends thereof.

An even further embodiment of the present invention provides such a system wherein the membrane is a plastic film.

Still yet another embodiment of the present invention provides such a system wherein the plastic film is selected from the group of plastic films consisting of urethane, polyester, polycarbonate, Polyvinylchloride, and polycarbonate.

A still yet further embodiment of the present invention provides such a system wherein the retention strip has a rectangular cross sectional shape.

Still even another embodiment of the present invention provides such a system wherein the retention strip further comprises a membrane attachment tongue orthogonal to a side of the retention strip distal to the first and second channel flanges.

One embodiment of the present invention provides a method for the holding of a membrane in tension, the method comprising: inserting a retention strip between channel flanges disposed in an assembled frame; seating of the retention strip; and contacting the channel flanges with the retention strip.

Another embodiment of the present invention provides such a method further comprising attaching the retention strip to the membrane prior to the step of inserting the retention strip between channel flanges of an assembled frame.

A further embodiment of the present invention provides such a method wherein the membrane is attached to the retention strip by an attachment technique selected from the group of techniques consisting of sewing, using chemical adhesives, thermally bonding the membrane to the strip, and sonically bonding the membrane to the strip.

Still another embodiment of the present invention provides such a method wherein the step of seating the strip in the channel further comprises the use of a retainer-channel seating device.

A still further embodiment of the present invention provides such a method wherein the retainer-channel seating device is a device having a proximal end having a width less than that of a distance between the first and the second flanges, and a radius of sufficient breadth to prevent kinking in the retention strip.

Yet another embodiment of the present invention provides such a method further comprising releasing the membrane from tension by removal of the retention strip from between the channel flanges disposed in the assembled frame.

A yet further embodiment of the present invention provides such a method wherein the step of removal comprises utilizing a hook or flat headed prying tool to remove a portion of the retention strip.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 12B is a cross sectional elevation view of a tensioned membrane display frame illustrating a method for installing a membrane retention strip in a channel such as that illustrated in FIG. 12A, that method configured in accord with one embodiment of the present invention.

FIG. 12C is a cross sectional elevation view of a tensioned membrane display frame illustrating an installed membrane retention strip disposed in a channel such as that illustrated in FIG. 12A, and configured in accord with one embodiment of the present invention.

FIG. 13A is a cross sectional elevation view of a tensioned membrane display frame illustrating one embodiment of the present invention having a curved channel.

FIG. 13B is a cross sectional elevation view of a tensioned membrane display frame illustrating a method of implanting a curved retention strip according to one embodiment of the present invention having a curved channel.

FIG. 13C is a cross sectional elevation view of a tensioned membrane display frame illustrating a method of implanting a curved retention strip according to one embodiment of the present invention having a curved channel.

FIG. 14A is a cross sectional elevation view of a tensioned membrane display frame illustrating a method for the insertion of a retention strip configured in accordance with one embodiment of the present invention.

FIG. 14B is a cross sectional elevation view of a tensioned membrane display frame illustrating a method for the engaging of a retention strip configured in accordance with one embodiment of the present invention.

FIG. 18A is a perspective view of a tensioned membrane display frame illustrating a method for the removal using a removal tool of a retention strip configured in accordance with one embodiment of the present invention.

FIG. 18B is an elevation view of a tensioned membrane display frame illustrating a method for the removal using a removal tool of a retention strip configured in accordance with one embodiment of the present invention.

FIG. 18C is a perspective view of a membrane to which is attached a retention strip illustrating a retention strip removal notch configured in accordance with one embodiment of the present invention.

FIG. 18D is a perspective view of a membrane to which is attached a retention strip illustrating a retention strip removal notch configured in accordance with one embodiment of the present invention.

DETAILED DESCRIPTION

Figure 1A:
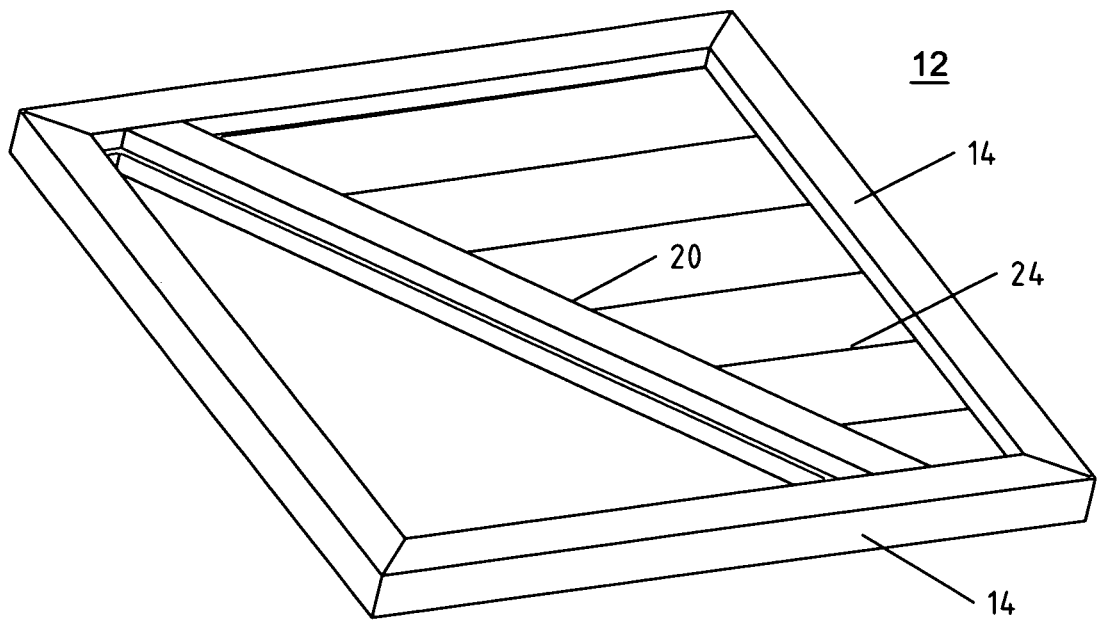
FIG. 1A is a perspective view of a tensioned membrane display frame illustrating a system for holding a membrane in tension configured in accordance with one embodiment of the present invention.
Figure 1B:
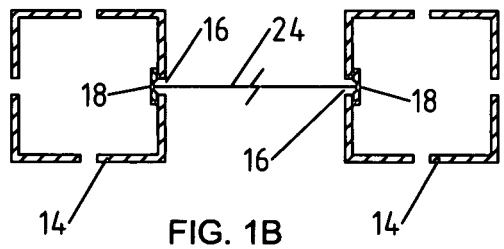
FIG. 1B is a cross sectional elevation view of a tensioned membrane display frame illustrating a system for holding a membrane in tension configured in accordance with one embodiment of the present invention.
Figure 4:
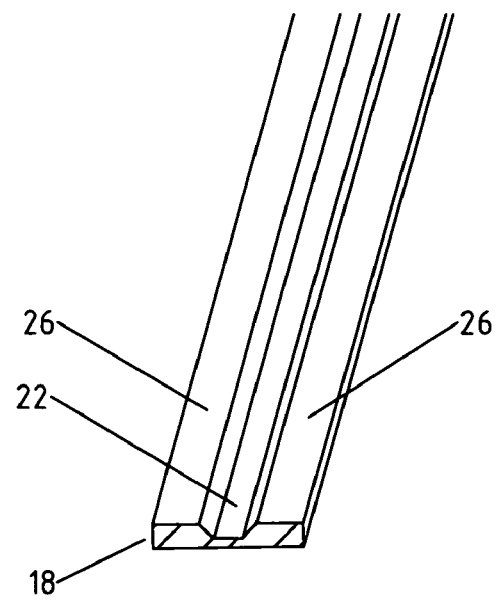
FIG. 4 is a perspective view of a retention strip for a system for holding a membrane in tension configured in accordance with one embodiment of the present invention.
Figure 5:
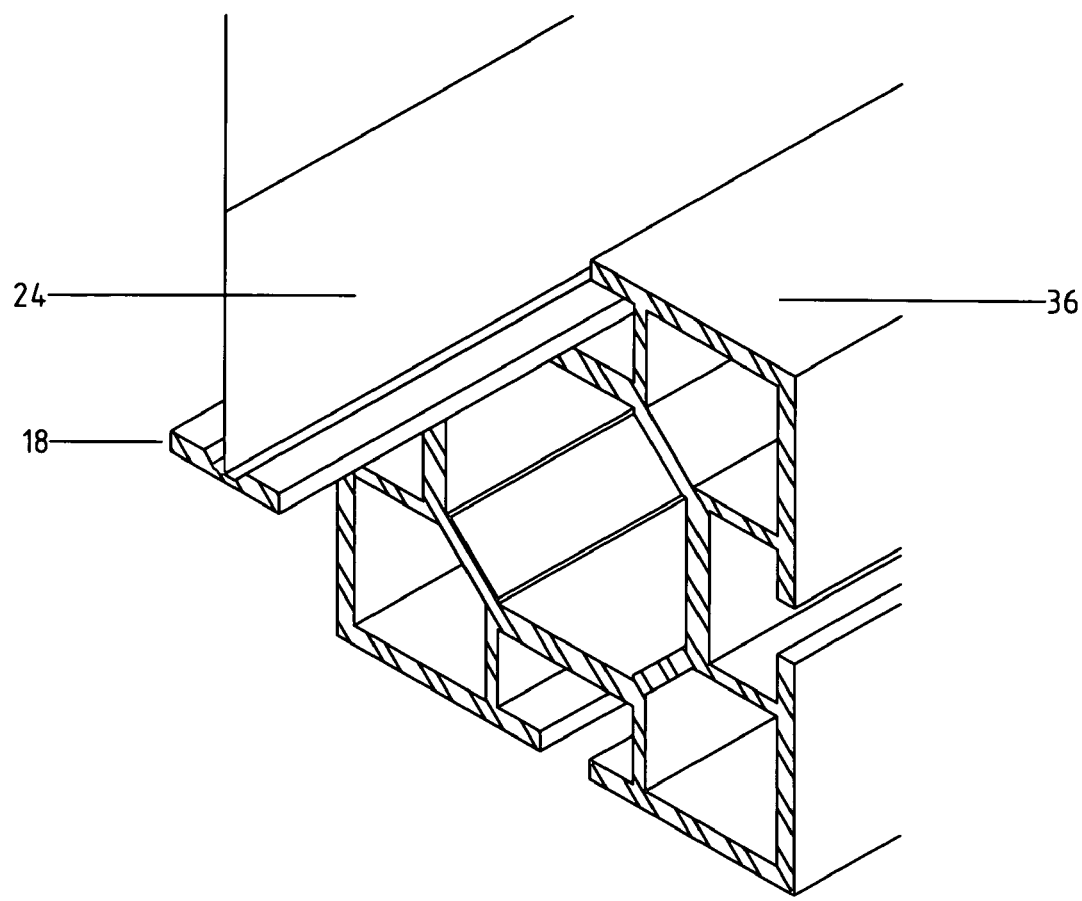
FIG. 5 is a cross sectional perspective view of a tensioned membrane display frame member illustrating a system for holding a membrane in tension configured in accordance with one embodiment of the present invention.

One embodiment of the present invention, illustrated in FIGS. 1A, 1B, and 5 comprises a tubular frame 12 with elongate tubular members 14 wherein are disposed longitudinal channels 16 configured to receive fabric or membrane tension retention strips 18. The tubular members 14 may be joined at the corners of the frame 12 or the end of a member may join the body of a second member, thus forming an interior bracing member 20. The fabric or membrane retention strips 18 may in one embodiment be provided with a groove or depression 22 best shown in FIG. 4 running along the length of the retention strip 18 and dividing the retention strip 18 into at least first and second retention sides 26, to which depression 22 membrane 24 is sewn or otherwise affixed at centerline 25 through the use of stitches, mechanical fasteners, ultrasonic welding, heat bonding, or adhesives. In other embodiments no such groove is provided, while in still further embodiments, a stitching tongue 72 may be provided orthogonally to the strip to attach the membrane to the strip. The membrane retention or anchoring strips 18 may be configured to be inserted into and removed from the longitudinal channels 16 without disassembling the frame 12, thereby facilitating the change of membranes 24 in displays. The membrane is held in tension orthogonally or non-parallel to the surface of the frame in which the retainer or anchor 18 is disposed.

One skilled in the art will readily appreciate that a variety of membranes may be used, including but not limited to synthetic and natural woven, knit, and non woven textiles, leathers, plastics, vinyl films, reinforced vinyl films, textile and metal and plastic meshes and screens, polypropylene films, Mylar films, and urethane films and other polymer films and membranes.

Figure 2:
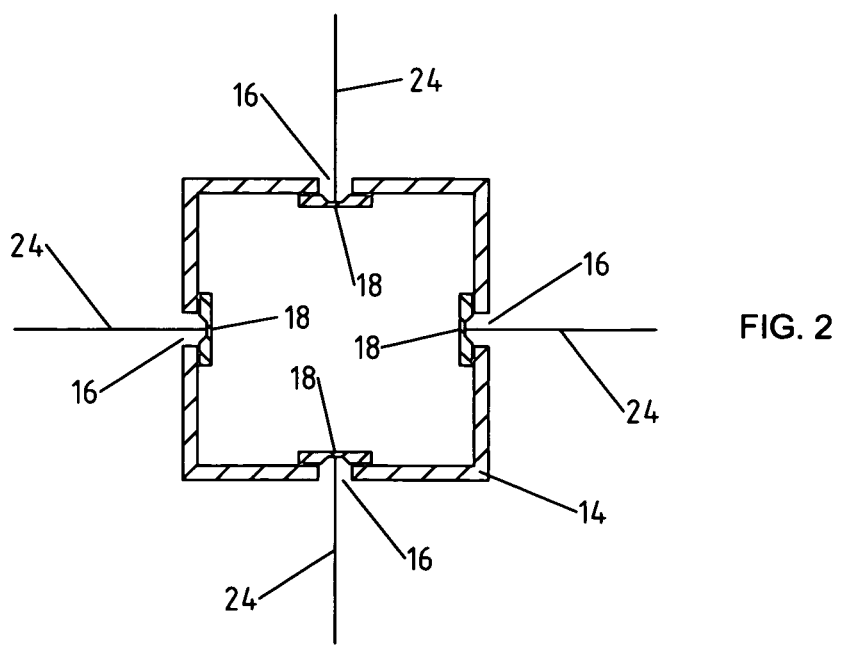
FIG. 2 is a cross sectional elevation view of a tensioned membrane retention system configured in accordance with one embodiment of the present invention.
Figure 3:
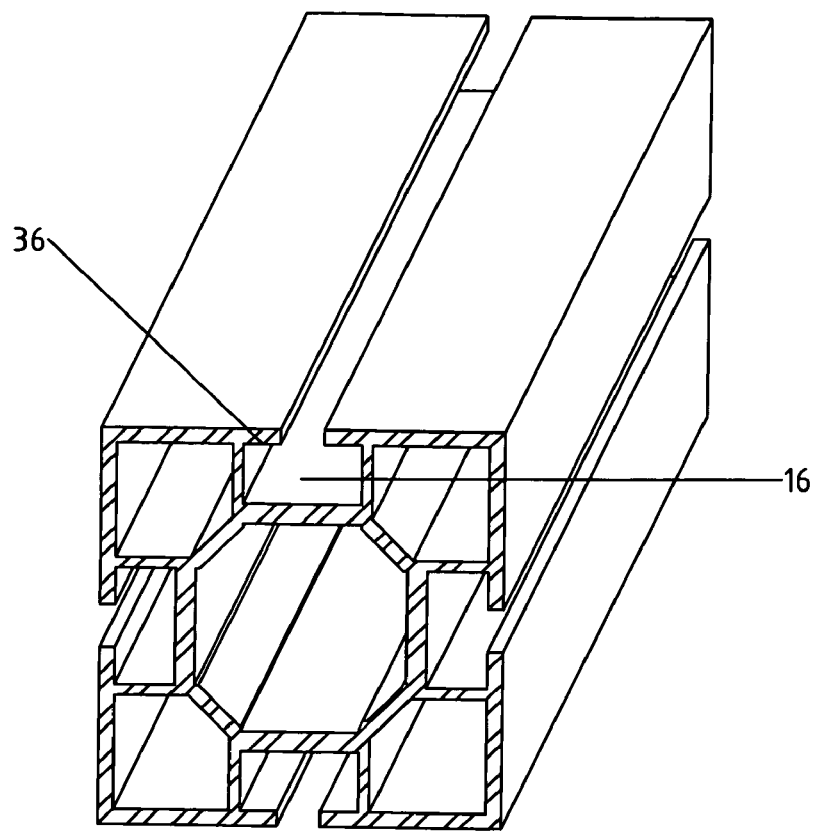
FIG. 3 is a cross sectional perspective view of a frame member of a system for holding a membrane in tension configured in accordance with one embodiment of the present invention.

According to various embodiments of the present invention, assorted shapes of tubular frame members 14 may be used, having substantially rectangular, square, triagonal, trapezoidal, rhomboidal, polygonal, oval or circular cross sections. A cross section of a square member is illustrated in FIGS. 2 and 3 illustrating the member with anchors or retainers installed and without, respectively. Similarly, longitudinal channels 16 may be configured in a variety of cross sectional forms, including but not limited to rectangular, circular, and square, so long as the channel 16 has sufficient capacity to accept the strip and afford the strip room to orient itself in a toggle position. Members may be provided with a plurality of channels disposed longitudinally along the sides of those members. Members may be configured from a variety of materials, metals such as, but not limited to, aluminum, brass, steel, woods such as, but not limited to, mahogany, oak, pine, and plastics. Such materials may be solid or hollow, and may be machined, carved or extruded to create channels 16. Members may be designed specifically for the system or may be commercially available seperately, such as those marketed by OCTANORM-Vertriebs-GmbH.

Some embodiments, such as that illustrated in FIG. 4, employ flat plastic retention strips 18. While in such embodiments no tab is used to attach the membrane, as the membrane can be affixed directly to the flat strip. Other embodiments may employ tongues 72 to fasten the membrane to the anchor or retainer. In one embodiment, the membrane is sewn to the center of a first side of the strip. The resulting seam may be disposed in a depressed, concave, or routed channel 22 to facilitate the stitching and to facilitate flexing of the strip 18 along the seam. In various embodiments, the strip 18 is configured such that the sides of the strip 26 may be compressed, bent, or folded to allow passage of the strip 18 into the channel 16, but then resiliently return to its expanded or unfolded position to prevent the unintended removal of the strip 18 from the channel 16.

Alternatively, no depression 22 need be made in the retention strip 18. In such embodiments, distortion of the strip is of diminished importance as the strip may tilt in the member channel 16 to permit the strip to slide past the edges of the member channel 16. Applying tension to the membrane 24 draws the retention strip 18 into contact with the member channel 16 opening, causing it to engage, like a toggle, preventing the membrane 24 from being pulled free of the channel 16.

According to an alternative embodiment, the membrane retention strips 18 may be configured having a T cross section. One skilled in the art will readily appreciate that other embodiments of the present invention may have different cross sections, with asymmetrical protrusions from the central core. Such strips, shaped like letters "d", "L", "V" and "J" may also permit removal or replacement of the strip.

According to one embodiment, the strip 18 may be configured from flexible polymers, such as, but not limited to, extruded polyester, low and high density polyethylene, polypropylene, polytetrafluoroethylene, and polycarbonate. The material from which the strip 18 is made must be flexible enough to deform to permit its introduction into, and removal from the channels 16. Such deformation does not need, in all embodiments, to be great, and where sufficient room is afforded for toggling, rigid or semi rigid retention strips 18 may be used.

Figure 6A:
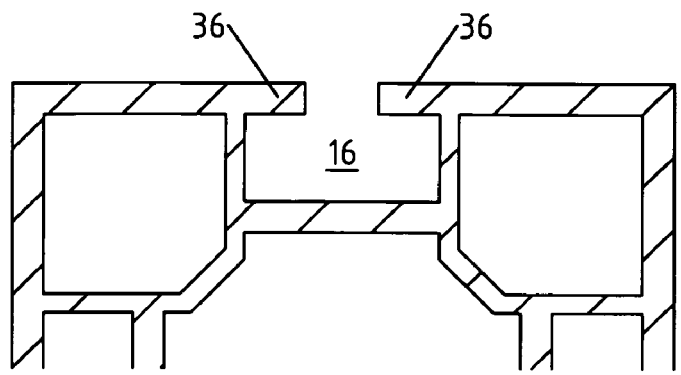
FIG. 6A is a cross sectional elevation view of a tensioned membrane display frame illustrating a channel for receiving a retention strip configured in accordance with one embodiment of the present invention.
Figure 6B:
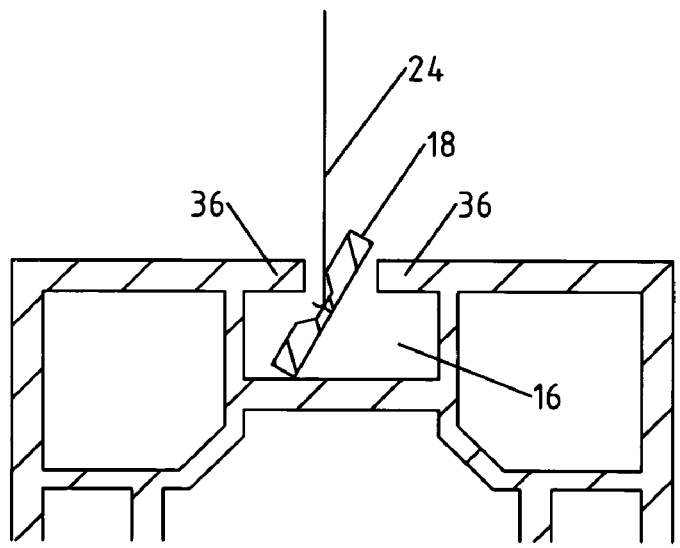
FIG. 6B is a cross sectional elevation view of a tensioned membrane display frame illustrating a method for the insertion of a retention strip configured in accordance with one embodiment of the present invention.
Figure 6C:
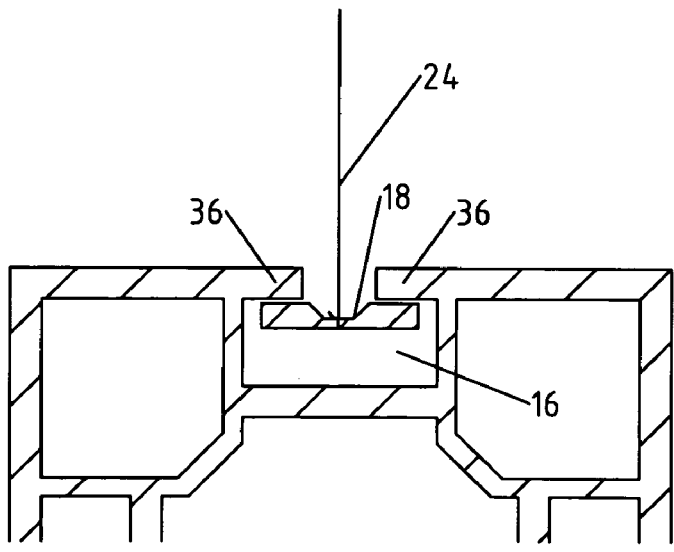
FIG. 6C is a cross sectional elevation view of a tensioned membrane display frame illustrating a method for the locking of a retention strip configured in accordance with one embodiment of the present invention.
Figure 7:
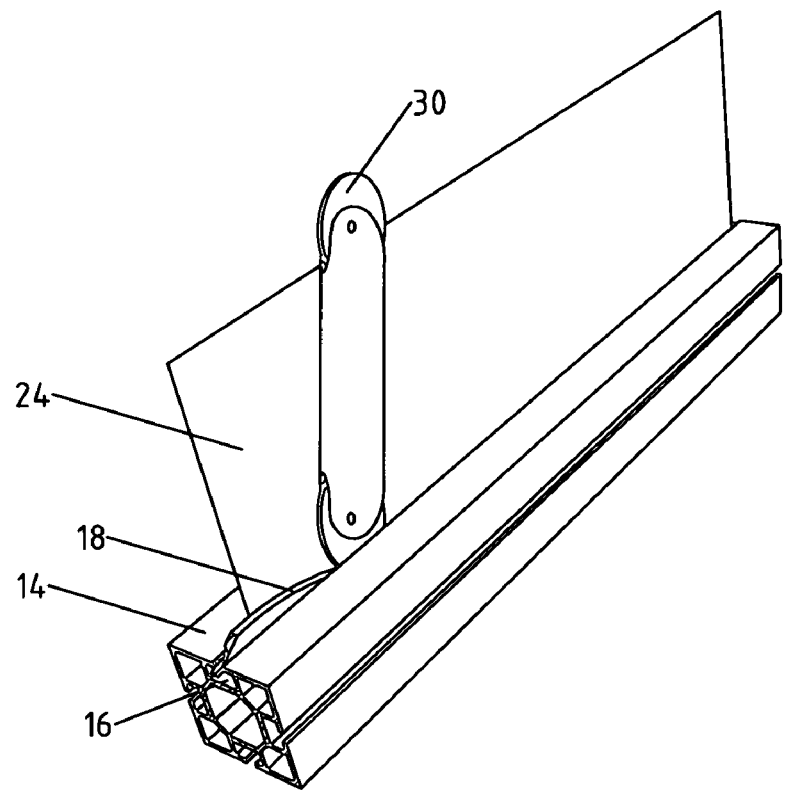
FIG. 7 is a cross sectional perspective view of a tensioned membrane display frame illustrating a method for the insertion and alignment, utilizing a rotary spline tool, of a retention strip configured in accordance with one embodiment of the present invention.

In one embodiment of the present invention a method for installing a tensioned membrane 24 is provided, illustrated in FIGS. 6A-6C, 7 and 9, wherein a membrane retention strip 18 is sewn or otherwise attached to the periphery of a membrane 24. As illustrated in FIG. 6A, the channel 16, is configured to receive the strip through an opening disposed between flanges 36. As illustrated in FIG. 6B the retention strip 18 is aligned with twisted and inserted diagonally into the channel 16 of a frame member 14. As illustrated in FIG. 7, the retention strip 18 is introduced into the channel 16 by means of a spline tool 30 such as those commonly used in the repair and manufacture of screen door panels. Other tools, such as that illustrated in FIGS. 9 and 15 whereby a curved end portion 64 can be used to press the strip into the channel, or even flat head screwdrivers may be used to force the retention strip 18 into the channel 16. Once the retainer 18 is seated into the channel 16 it is brought into contact with frame channel flanges 36 where it returns to its original shape thereby securing the screen, fabric or membrane 24 in place.

Figure 8:
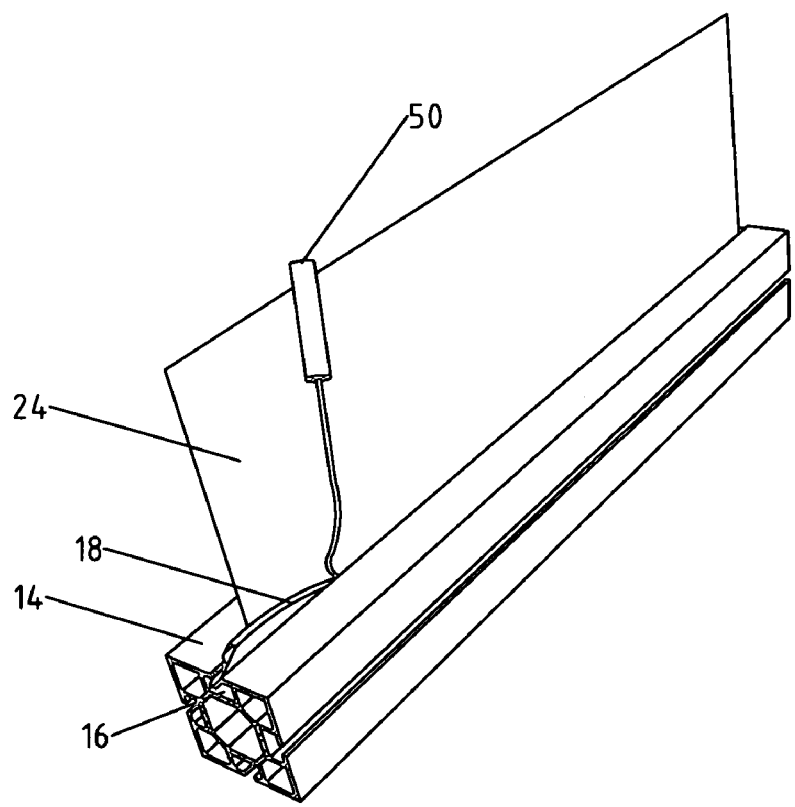
FIG. 8 is a cross sectional perspective view of a tensioned membrane display frame illustrating a method for the removal, utilizing a hook tool, of a retention strip configured in accordance with one embodiment of the present invention.
Figure 9:
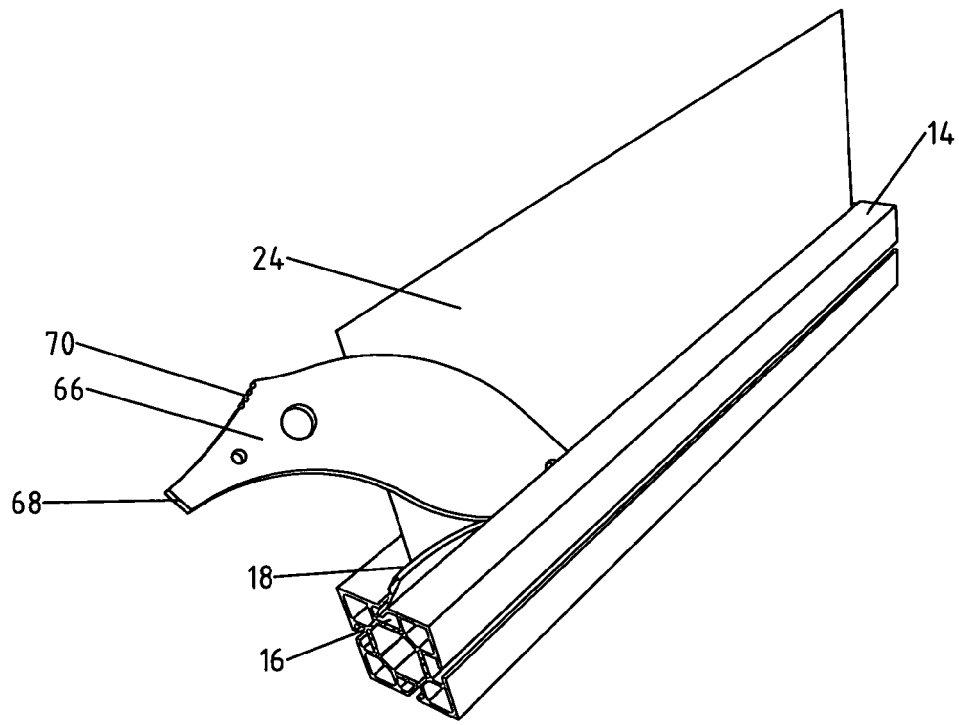
FIG. 9 is a cross sectional perspective view of a tensioned membrane display frame illustrating a method for the insertion and alignment, utilizing a retention strip insertion and removal tool, of a retention strip configured in accordance with one embodiment of the present invention.
Figure 10:
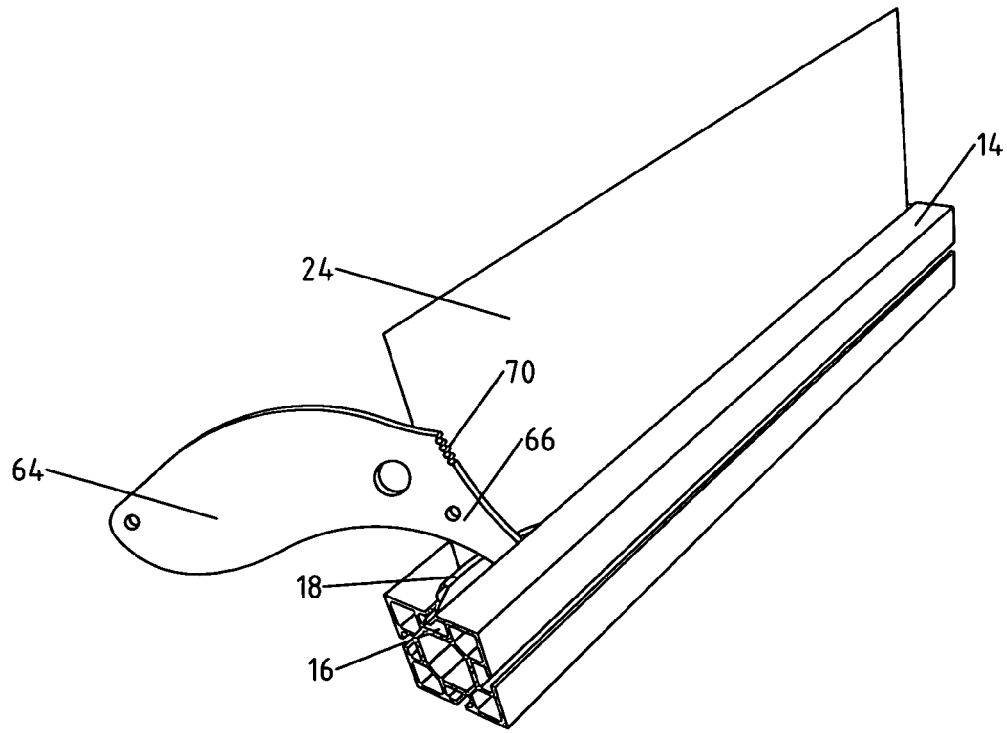
FIG. 10 is a cross sectional perspective view of a tensioned membrane display frame illustrating a method for the removal, utilizing a utilizing a retention strip insertion and removal tool, of a retention strip configured in accordance with one embodiment of the present invention.
Figure 15:
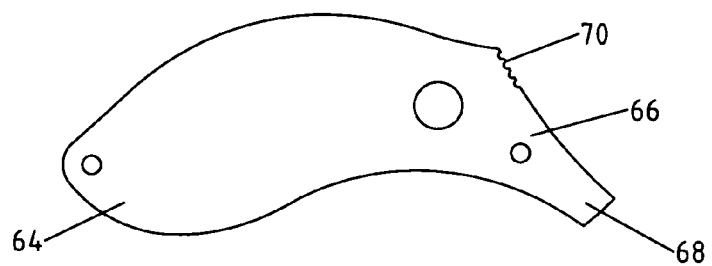
FIG. 15 is an elevation view of a tool configured according to one embodiment of the present invention

FIGS. 8 and 10 illustrate methods by which the strip may be removed using a hook 50 or flat prying end 68 of the tool illustrated in FIG. 15.

Figure 11A:
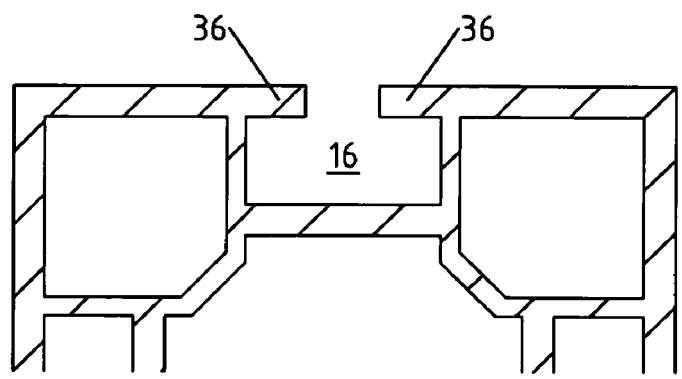
FIG. 11A is a cross sectional elevation view of a tensioned membrane display frame configured in accordance with one embodiment of the present invention having a shallow channel.
Figure 11B:
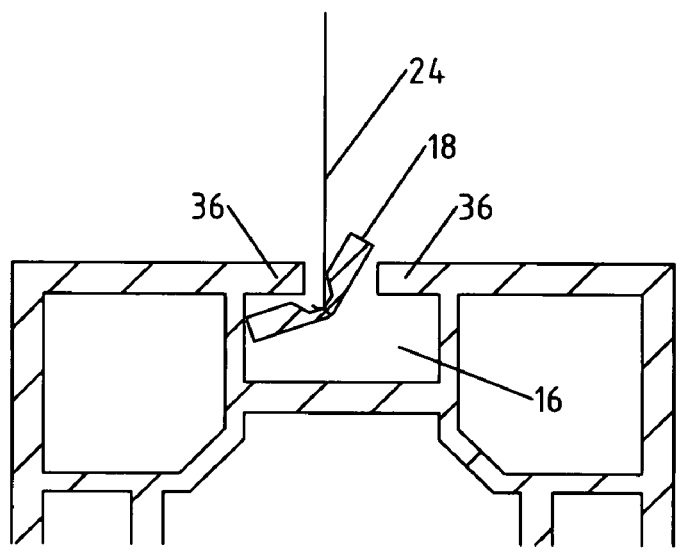
FIG. 11B is a cross sectional elevation view of a tensioned membrane display frame illustrating a method of inserting a membrane retention strip in accordance with one embodiment of the present invention having a shallow channel.
Figure 11C:
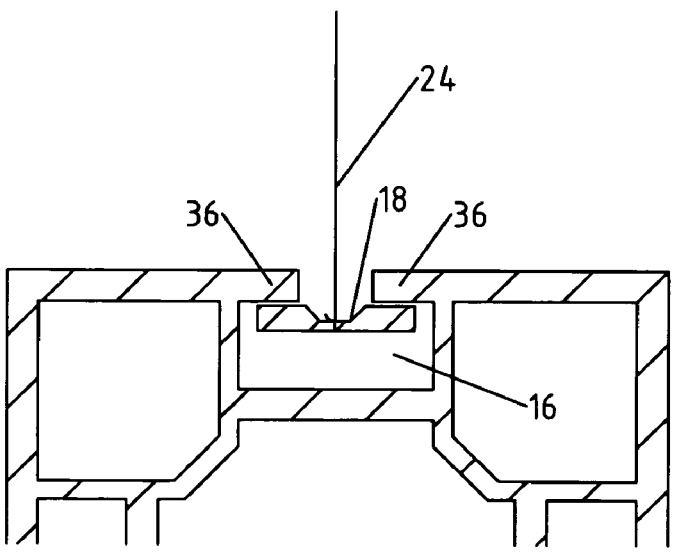
FIG. 11C is a cross sectional elevation view of a tensioned membrane display frame wherein a retention strip and tensioned membrane are disposed configured in accordance with one embodiment of the present invention having a shallow channel.

FIG. 11A illustrates a channel configured with deep flanges 36 and a shallow channel 16. As illustrated in FIG. 11B, the membrane 24 is stitched to a central groove of the strip 18, such that the strip is easily flexible and the strip may be creased along the groove to allow it to be disposed within the channel. The strip 18 is then disposed within the channel as illustrated in FIG. 11C, providing tension on the membrane 24 and thus holding the retention strip in place.

Figure 12A:
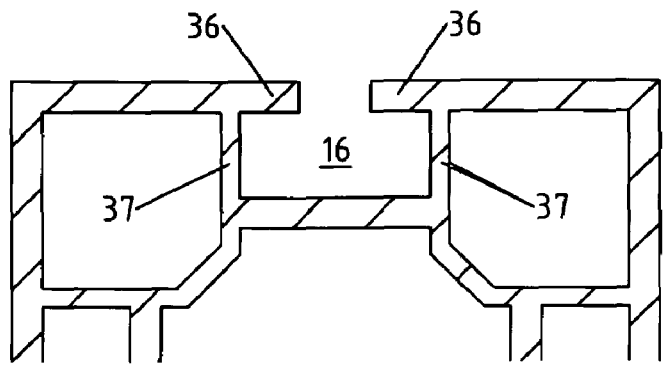
FIG. 12A is a cross sectional elevation view of a tensioned membrane display frame having a wide mouthed, deep channel, and shallow flanges configured in accordance with one embodiment of the present invention.
Figure 11B:
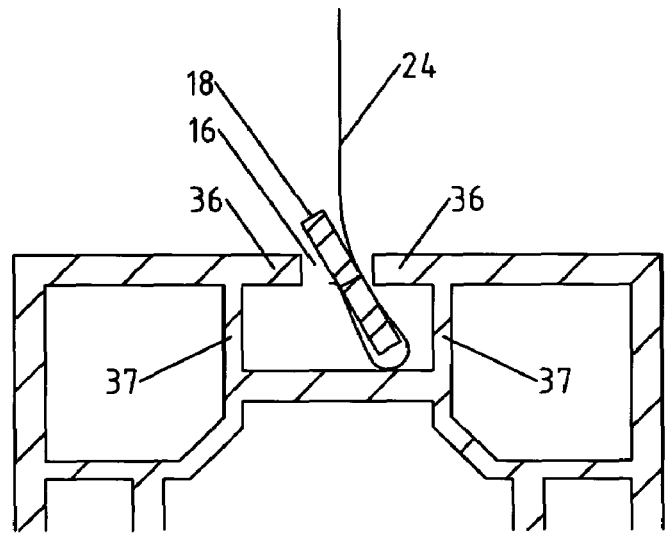
Figure 11C:
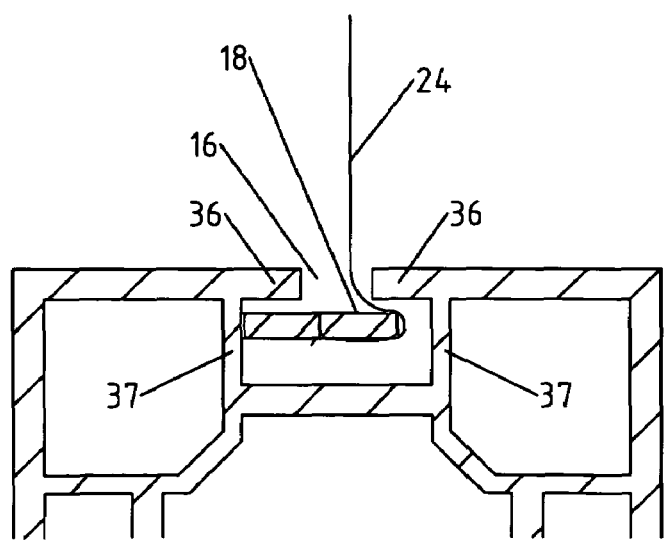

FIG. 12A illustrates a channel 16 that is deep but configured with shallow flanges 36 and walls 37 proximal to the strip 18. As illustrated in FIG. 12B, the membrane 24 of this embodiment is affixed to the side of the strip 18 that is disposed distal to the flanges 36. Strip 18 is inserted such that the surface of the strip 18 that is fastened to the membrane 24 is inserted first and the side not in contact with the membrane is lowered into the channel 16 past the flanges last. When, as illustrated in FIG. 12C, tension is applied to the membrane 24, the membrane 24 is forced against a flange 36, in turn forcing the strip 18 against the wall 37 of the channel 16. The strip 18, and thus the membrane 24, is thereby secured in the channel 16.

FIGS. 13A-13C illustrate installation of a curved retention strip 62 in a curved channel 60. The strip 62 is inserted on edge, rotated and positioned against the flanges 36. The membrane 24 is then in its tensioned position as illustrated in FIG. 13C.

A similar process is illustrated in FIGS. 14A and 14B where a rigid or semi-rigid strip is inserted between flanges 36 and secured behind the flanges 36.

FIG. 15 illustrates a tool configured to install and remove strips configured in accord with one embodiment of the present invention. The tool is provided with a curved installation end 64, which allows the strip to be pressed into the channel without damage to or crimping of the strip. A removal end 66 is configured with a flat head prying tool 68 by which the strip may be pried up, past the flanges and released. The removal end is also configured in one embodiment with grooves or texture 70 to provide a secure hand grip when using the installation end 64.

Figure 16A:
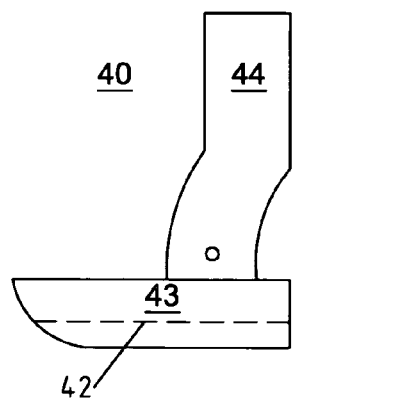
FIG. 16A is a side elevation view of a sewing presser foot for use with a system for holding a membrane in tension configured in accordance with one embodiment of the present invention.
Figure 16B:
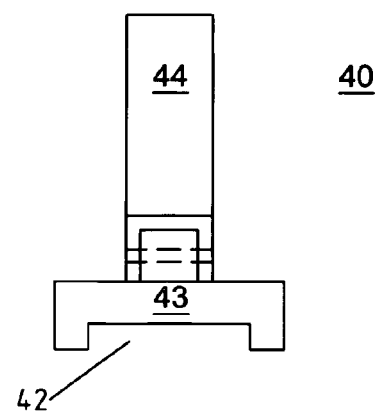
FIG. 16B is a front elevation view of a sewing presser foot for use with a system for holding a membrane in tension configured in accordance with one embodiment of the present invention.
Figure 16C:
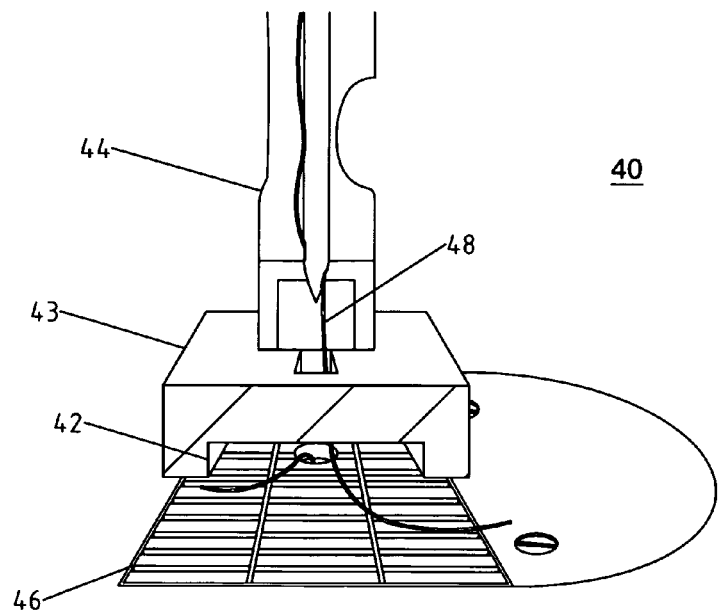
FIG. 16C is a perspective view of a sewing presser foot for use with a system for holding a membrane in tension configured in accordance with one embodiment of the present invention.

In one embodiment of the present invention, the attachment of the membrane to the strip utilizes a specially configured sewing machine presser foot illustrated in FIGS. 16A-16C. Such a specialized presser foot attachment 40 may be configured with an attaching column 44 that attaches the foot block 43 to the machine, a notched bottom profile 42 to receive the retention strip 18 and to center the retention strip beneath the foot 40, and to hold the membrane in contact with the machine feed mechanism 46. The sewing machine needle and thread 48 is deployed through a hole disposed in the front half of the top of the foot 40.

Figure 17:
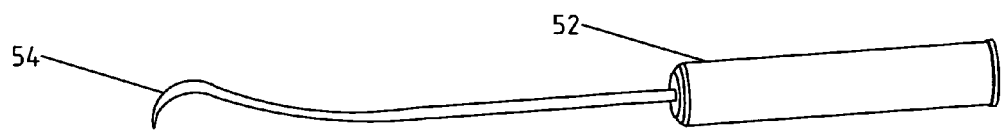
FIG. 17 is a perspective view of a strip removal tool for use with a system for holding a membrane in tension configured in accordance with one embodiment of the present invention.

As illustrated in FIG. 17, one embodiment of the present invention provides a strip removal tool 50 comprising a handle 52 and a hook 54. As illustrated in FIGS. 18A-18B, the strip removal tool may be used to engage the strip and begin the removal process, orienting the strip 18 for removal. As illustrated in FIGS. 18C and 18D curved notches 54 may be disposed at points or at a single point along the strip 18 to allow the tool 50 to obtain a greater purchase on the strip, and to facilitate the removal thereof.

Figure 19A:
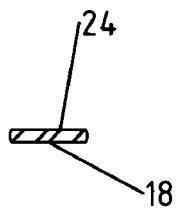
FIG. 19A is a cross sectional elevation view of a membrane retention strip with beveled corners configured in accordance with one embodiment of the present invention.
Figure 19B:
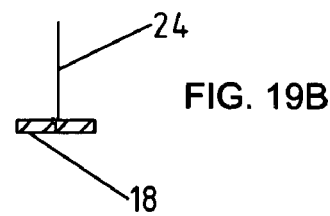
FIG. 19B is a cross sectional elevation view of a membrane retention strip with beveled corners having a membrane attached and configured in accordance with one embodiment of the present invention.
Figure 20A:
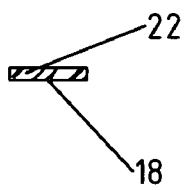
FIG. 20A is a cross sectional elevation view of a membrane retention strip with a longitudinal central groove configured in accordance with one embodiment of the present invention.
Figure 20B:
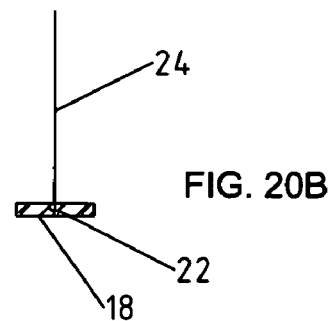
FIG. 20B is a cross sectional elevation view of a membrane retention strip with a longitudinal central groove having a membrane attached and configured in accordance with one embodiment of the present invention.
Figure 21A:
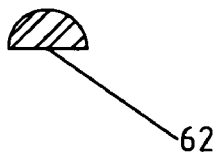
FIG. 21A is a cross sectional elevation view of a membrane retention strip having a semicircular cross-section and configured in accordance with one embodiment of the present invention.
Figure 21B:
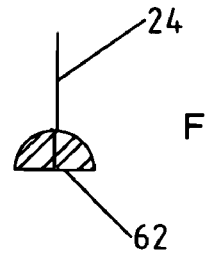
FIG. 21B is a cross sectional elevation view of a membrane retention strip having a semicircular cross-section, having a membrane attached and configured in accordance with one embodiment of the present invention.
Figure 22A:
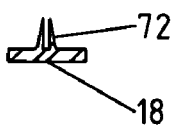
FIG. 22A is a cross sectional elevation view of a membrane retention strip with a split extruded welding tongue configured in accordance with one embodiment of the present invention.
Figure 22B:
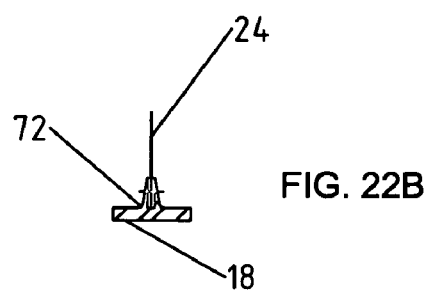
FIG. 22B is a cross sectional elevation view of a membrane retention strip with a split extruded welding tongue having a membrane disposed in the split and configured in accordance with one embodiment of the present invention.

FIGS. 19A-22B illustrate cross sections of alternative retention strip designs. FIG. 19A illustrates a strip having beveled or chamfered corners, the center of which may be affixed by various means to a membrane as illustrated in FIG. 19B. FIG. 20A illustrates a strip having a central groove or depression 22 similar to that illustrated in FIG. 4, the center of which may be affixed by various means to a membrane as illustrated in FIG. 20B. FIG. 21A illustrates a strip 62 having a semicircular or curved cross-section similar to that illustrated in FIGS. 13B-13C, the center of which may be affixed by various means to a membrane as illustrated in FIG. 21B. Such an embodiment may effectively be used in situations where the flanges are uneven or where the channel is curved. In FIG. 22A, an orthogonal tongue 72 is provided to which the membrane may be attached. The tongue 72 may be split to facilitate ultrasonic fabric welding or stitching as illustrated in FIG. 22B. Alternatively it may be solid.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but the claims appended hereto.

That which is claimed is:

1. A system for removably holding a stretchable tension-fabric membrane in tension within a supporting frame in such a manner that said membrane is freely constrained along its perimeter by a retention strip sewn or otherwise flexibly attached to said perimeter, said system comprising a supporting frame and a stretchable tension-fabric membrane, a. said tension-fabric being a thin pliable sheet of cloth or elastomer, characterized by a high value of elastic elongation and said membrane, when lying flat and unstressed, having a defined outer perimeter and a thickness;
b. said supporting frame being proportionally larger than said membrane along said perimeter thereof and comprised of a plurality of connected frame members having longitudinal anchoring channels therein, each said anchoring channel having a depth, a width, first and second channel flanges and an open gap between and defined by said flanges, said gap being narrower than said channel width and being occluded at points along said frame members where other frame members connect thereto;
c. said perimeter of said membrane stretched to, and supported under tension within, said open gap along said frame members, except where said gap is so occluded, by a retention strip fastened along said perimeter by continuous stitching, welding or bonding, said retention strip being discontinuous along its said length at points corresponding to said points of occlusion in said gap;
d. said retention strip being a semi-rigid ribbon of elastically deformable material with a rectangular cross-section and having a width, a thickness and a length, said width slightly less than but approximating said channel width, and said retention strip fastened along its length at the centerline of its width to said perimeter of said membrane, such that when supported in said anchoring channels behind said channel flanges, said retention strip is centered by its width within said channel width and holds said membrane substantially centered between, and free of contact with, said channel flanges of said frame members;

whereby said membrane is elastically stretched, exerting thereby elastic tension upon said retention strip, and is centered along said perimeter between said channel flanges in a manner that allows the stretched membrane to assume a free tensile shape not distorted by contact with said supporting frame at any point, and whereby said retention strip may be inserted into and removed from said anchoring channels perpendicularly thereto, and thereby not obstructed at the intersections of connecting frame members, as would be the case if inserted by sliding along said anchoring channels.

2. A process of assembling a system for removably holding a stretchable tension-fabric membrane within a supporting frame, said system comprising a supporting frame and a stretchable tension-fabric membrane with a retention strip,
   a. said tension-fabric being a thin pliable sheet of cloth or elastomer, characterized by a high value of elastic elongation;
   b. said membrane, when lying flat and unstressed, having a defined outer perimeter and a thickness;
   c. said supporting frame being proportionally larger than said perimeter of said membrane and comprised of a plurality of connected frame members having longitudinal anchoring channels therein, each said anchoring channel having a depth, a width, first and second channel flanges and an open gap between and defined by said flanges;
   d. said gap being narrower than said channel width, and being occluded at points along said frame members where other frame members connect thereto;
   e. said retention strip being a semi-rigid ribbon of elastically deformable material with a rectangular cross-section and having a width, a thickness and a length, said width slightly less than but approximating said channel width, said retention strip fastened along its length by continuous stitching, welding or bonding at the centerline of its width to said perimeter of said membrane, and said retention strip being selectively made discontinuous at points along said perimeter corresponding to discontinuities in said open gap resulting from said points of occlusion;
   f. said process comprising the steps of
      (1) forcibly stretching said perimeter of said membrane to approximate its edges along corresponding pre-assigned unobstructed lengths of said anchoring channel;
      (2) inserting said retention strip through said open gap and into said anchoring channel in a direction perpendicular to said first and second channel flanges that define said open gap;
      (3) rotating and relaxing said retention strip within said anchoring channels such that it assumes an orientation perpendicular to said membrane surface and parallel to said channel flanges; and
      (4) relaxing the force stretching said membrane, allowing internal energy stored therein by said stretching to draw said perimeter and said retention strip outwardly from within said channel, said strip thus drawn against said inner surfaces of said channel flanges and aligned by and contained within said width of said anchoring channel, whereby said membrane is elastically stretched along its perimeter, exerting thereby elastic tension upon said retention strip, and is centered along said perimeter between said channel flanges in a manner that allows said stretched membrane to assume a free tensile shape not distorted by contact with said supporting frame at any point.

3. A process of disassembling a system for holding a stretchable tension-fabric membrane within a supporting frame, said system comprising a supporting frame and a stretchable tension fabric membrane,
   a. said tension-fabric being a thin pliable sheet of cloth or elastomer, characterized by a high value of elastic elongation;
   b. said membrane having an outer perimeter stretched and constrained by said retaining strip within said supporting frame;
   c. said supporting frame being proportionally larger than a relaxed perimeter of said membrane and comprised of a plurality of connected frame members having longitudinal anchoring channels therein, each said anchoring channel having a depth, a width, first and second channel flanges and an open gap between and defined by said flanges;
   d. said gap being narrower than said channel width, and being occluded at points along said frame members where other frame members connect thereto;
   e. said retention strip being a semi-rigid ribbon of elastically deformable material with a rectangular cross-section and having a width, a thickness and a length, said width slightly less than but approximating said channel width, said retention strip fastened along its length by continuous stitching, welding or bonding at the centerline of its width to said perimeter of said membrane, and said retention strip discontinuous at points along said perimeter corresponding to said points of occlusion;
   f. said process comprising the steps of
      (1) inserting a removal tool between said perimeter of said membrane and one of said first and second channel flanges, and against said retention strip;

(2) applying force sufficient to overcome the force of stretching said membrane, to move thereby said tool into said anchoring channel, deforming said retention strip and positioning said tool behind one edge of said strip;

(3) forcibly sliding said tool along said one of said first or second channel flanges to elastically deform said cross-section of said retention strip across its width, thereby causing said retention strip to exit from within said anchoring channel outwardly from said gap perpendicular to said first and second channel flanges; and (4) forcibly sliding said tool along said retention strip to progressively deform, remove and elastically relax said strip from said anchoring channel flanges without causing sliding of said strip along said channel, thereby removing all sections of said retention strip seriatim from said anchoring channels, and thus freeing said tension-fabric membrane to restore itself to its smaller original unrestrained and unstressed perimeter.

* * * * *